United States Patent [19]
Webb

[11] Patent Number: 6,053,556
[45] Date of Patent: Apr. 25, 2000

[54] RETRACTABLE COVER APPARATUS FOR TRUCK BEDS

[76] Inventor: Robert O. Webb, Rte. 2 Box 2200, Townsend, Ga. 31331

[21] Appl. No.: 09/006,557

[22] Filed: Jan. 13, 1998

[51] Int. Cl.[7] .................................................. B60J 11/00
[52] U.S. Cl. ...................................... 296/98; 296/100.15
[58] Field of Search ................................. 296/98, 100.11, 296/100.15, 100.16, 100.17, 100.18

[56] References Cited

U.S. PATENT DOCUMENTS

| | | | |
|---|---|---|---|
| 3,152,600 | 10/1964 | Stark | 296/100.16 X |
| 3,467,431 | 9/1969 | Turcotte | 296/98 |
| 3,521,927 | 7/1970 | Barry | 296/100.16 |
| 3,977,719 | 8/1976 | Thurston | 296/98 |
| 5,125,713 | 6/1992 | Willingham et al. | 296/98 |

OTHER PUBLICATIONS

Automotive News, p. 14, Dec. 1983.

*Primary Examiner*—Joseph D. Pape
*Attorney, Agent, or Firm*—Kenneth S. Watkins, Jr.

[57] ABSTRACT

A retractable cover apparatus for truck beds comprises a rectangular shaped flexible web having a front end fixed to the shell of a spring powered roll. Brackets fix the roll to either side wall at the forward portion of the bed. The spring is chosen to provide at least the minimum retracting force which provides stability of the cover web without side fasteners. A back fastener secures the cover web to the back of the truck bed. A pull strap attached to the back end of the cover web allows extension and retraction of the cover web by a single operator from the back of the truck.

15 Claims, 5 Drawing Sheets

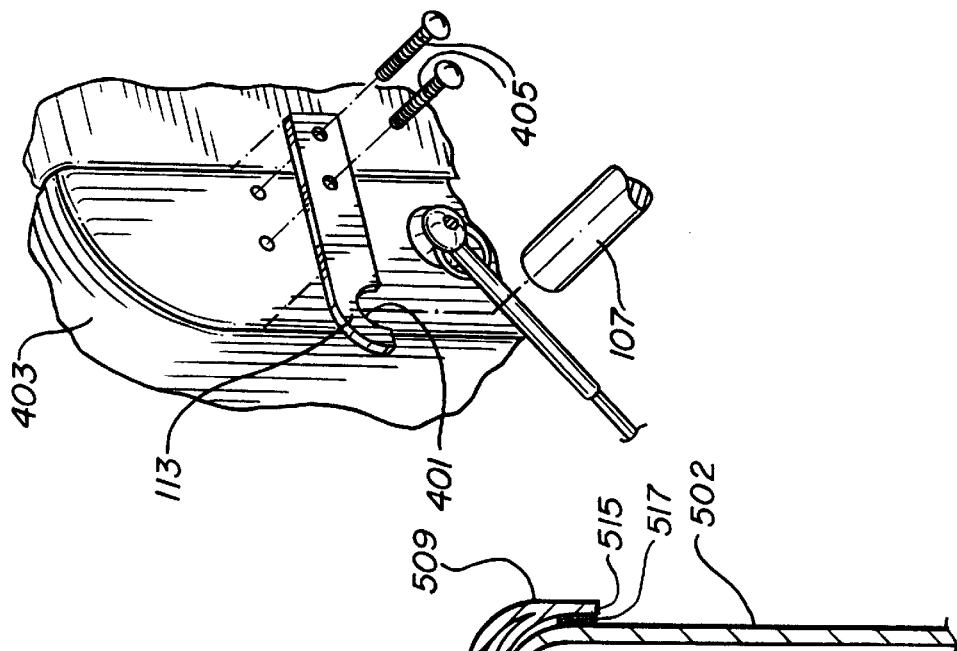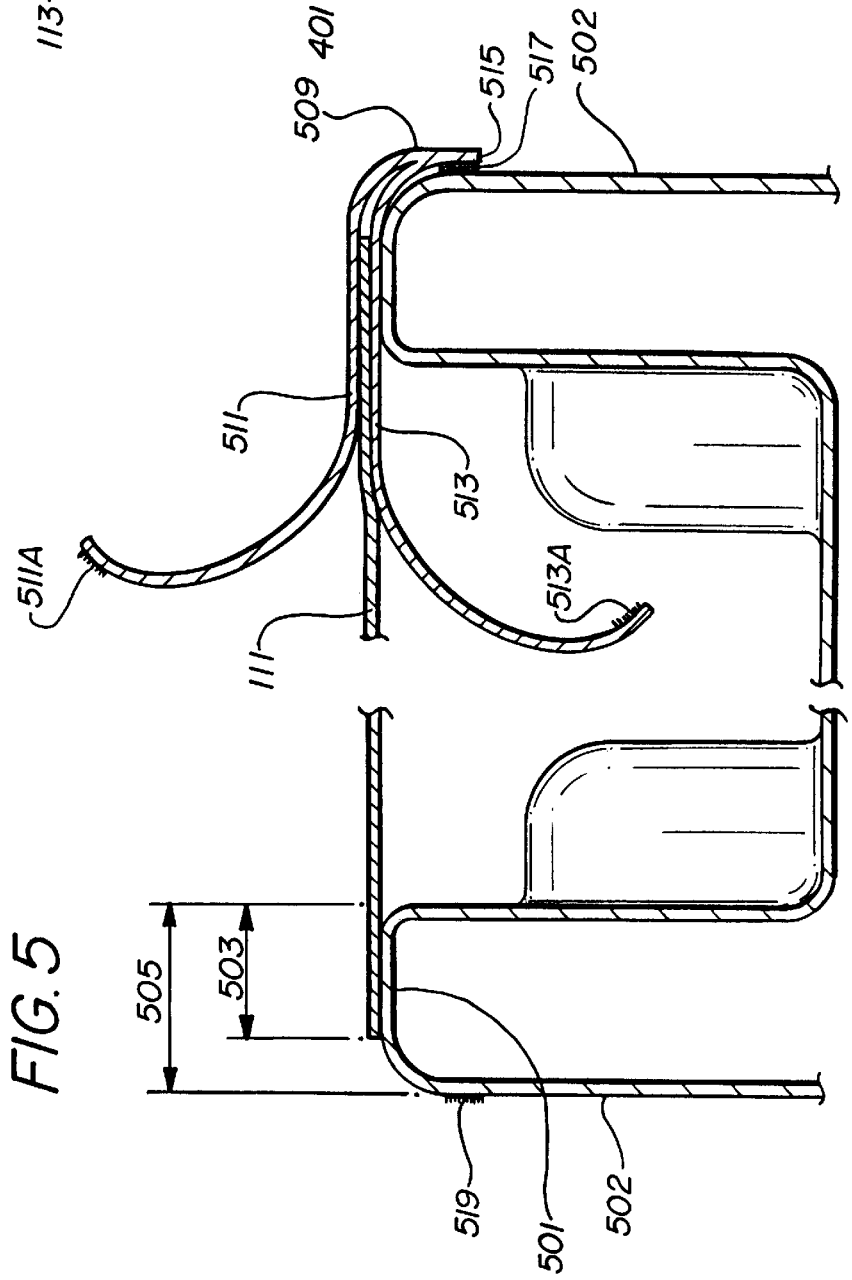

RETRACTABLE COVER APPARATUS FOR TRUCK BEDS

BACKGROUND OF THE INVENTION

The present invention relates to covers for truck beds and, more particularly, to flexible truck bed covers which are retractable.

The popularity of pickup trucks has grown significantly in recent past years. In addition to increased numbers of pickup trucks in the traditional markets of builders, contractors, and delivery vehicles, pickups have become popular as recreational and commuting vehicles. Along with the greater numbers of pickup trucks comes increased needs for new applications of the vehicles.

Truck bed covers have gained popularity among many pickup truck owners as a means to protect cargo which may be damaged by wind or weather during transport. Flexible covers which can be wound on a storage roll mounted on one end of the bed have become especially popular due to the convenience of cover storage and ease of use.

U.S. Pat. No. 3,146,824 discloses a flexible cover for truck bodies. The cover is wound on a spring roller in the stored position. A plurality of fasteners are spaced along the side and rear edges of the cover. The complementary fasteners are mounted along the top edges of the side and rear walls of the pickup body. U.S. Pat. No. 5,096,250 discloses a roll-away cargo box cover. The device utilizes side rails which retain transverse stiffeners to which the cover is secured.

These and other devices have not fully addressed the needs of many owners due to the need to engage and disengage a number of fasteners, or the devices are complicated and expensive.

OBJECTS AND SUMMARY OF THE INVENTION

Therefore and object of the present invention is to provide a pickup bed cover which can be quickly extended over the bed or retracted into a storage condition easily without the need for engaging or disengaging a large number of fasteners.

A further object of the present invention is to provide a pickup bed cover apparatus which covers a cargo in the bed which extends above the side walls of the bed.

A further object of the present invention is to provide a pickup bed cover apparatus which may be used with a pickup truck with or without a transverse toolbox installed in the bed.

A further object of the present invention is to provide a pickup bed cover apparatus which can be operated easily by a single operator.

Yet another object of the present invention is to provide a pickup bed cover apparatus which is simple, low in cost and easy to maintain.

The retractable cover consists of a rectangular shaped flexible web having a width sufficient to cover the open part of the bed with an overlap of at least half of the bed wall width on each side, and a length sufficient to cover the desired length of the bed. The front end of the web is fixed to the outside surface of a spring powered roll. The web is wound around the roll so that the spring in the roll produces a retracting force when the web is extended. Brackets support the spring powered roll from the truck bed walls in the front portion of the truck bed. A fastener on the back end of the cover web fastens the web to the rear portion of the truck when the web has been extended over the bed.

The retracting force of the spring powered roll is chosen to provide a retracting force of at least 0.4 pounds per lineal inch width of the cover web. This value has been found to provide stability of the cover web at highway speeds without the use of side fasteners on the cover web or tracks mounted along the truck bed walls, greatly improving the speed and convenience of covering or uncovering a cargo in the bed. A pull cord attached to the back end of the cover web provides a convenient means to extend the cover web against the retracting force by a single operator standing at the rear of the truck.

Polymer impregnated fabrics having a weight of at least 10 ounces per square yard and, preferably, at least 14 ounces per square yard, provide additional stability to the web when the vehicle is at highway speeds. In long bed length applications, elastic strips, bands or web straps may be used to further increase the stability of the web.

The spring roller may be mounted directly behind the cab of the pickup truck or it may be mounted to the rear of a longitudinally mounted tool box, if present.

BRIEF DESCRIPTION OF THE DRAWINGS

These and other features, aspects and advantages of the present invention will become better understood with regard to the following description, appended claims and accompanying drawings where:

FIG. 4 is a detail perspective drawing of the back attachment brackets used to retain the cover web in the extended position;

FIG. 5 is a cross section of the cover web in the extended position taken at lines 5—5 of FIG. 2;

DESCRIPTION OF THE PREFERRED EMBODIMENTS

The following is a description of the preferred embodiments of a retractable cover for truck beds. The cover is simple and can be engaged quickly without supplementary edge supports.

Figure 1:
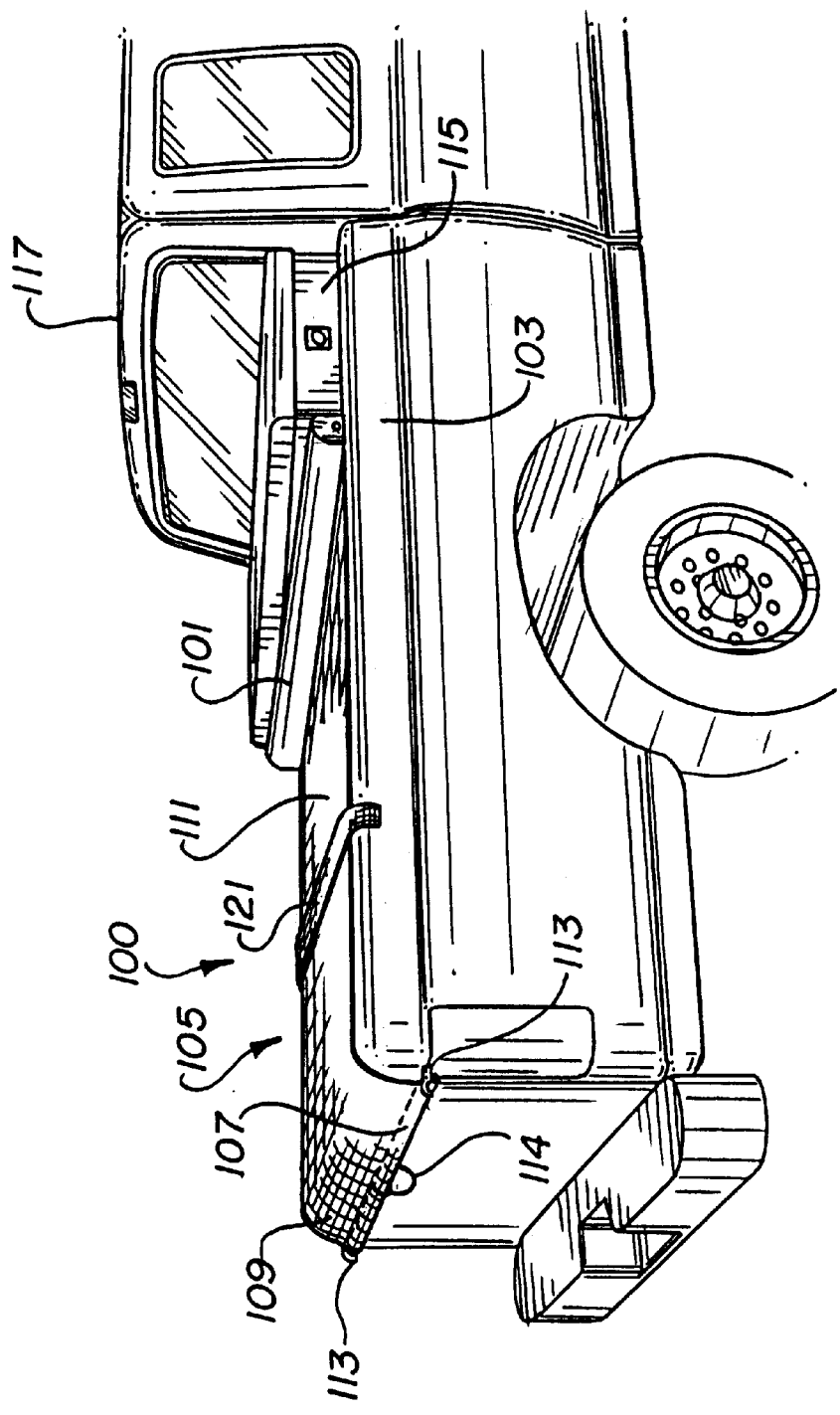
FIG. 1 is a perspective drawing of the retractable cover apparatus installed on the bed of a pickup truck, the bed having an installed tool box and the cover web in the extended position.

FIG. 1 is a perspective drawing of truck cover apparatus 100 with roller assembly 101 mounted transversely to the front portion 103 of truck bed 105. Back support bar 107 attached to the back end 109 of cover web 111 spreads web 111 and engages back attachment brackets 113. Pull cord 114, used to extend and retract web 111, is shown tucked under web 111. Roller assembly 101 is shown mounted immediately to the rear of tool box 115. In truck beds in which a tool box is not utilized, roller assembly 101 is mounted immediately to the rear of cab 117.

Figure 2:
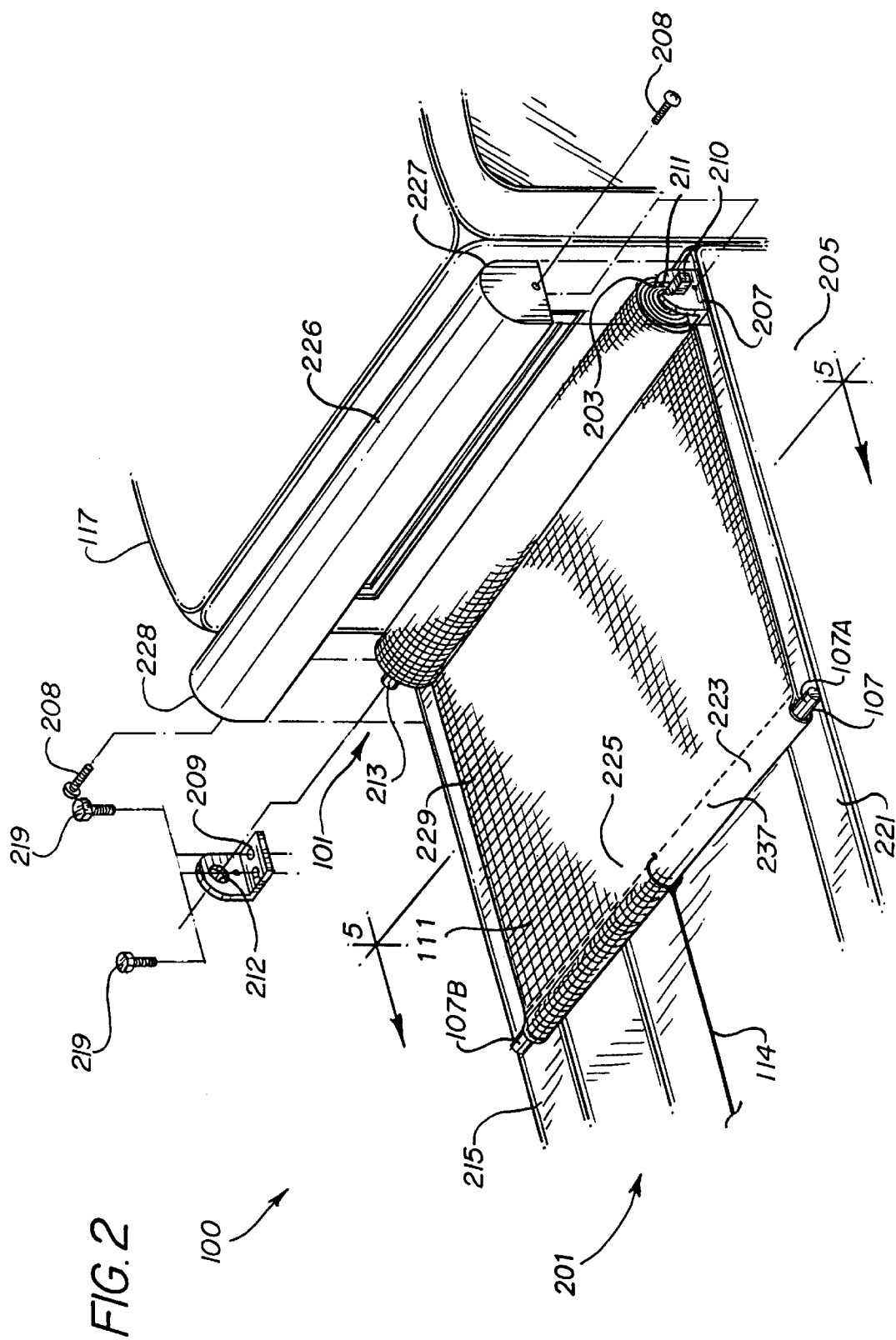
FIG. 2 is a detail perspective drawing of the roll assembly and cover web installed in the front portion of a pickup bed, the cover web partially retracted.

FIG. 2 is a detail perspective drawing of cover apparatus 100 showing installation on truck bed 201 without a tool box. Roller assembly 101 comprises roll 203 rotateably supported to front portion 205 of truck bed 201 by brackets 207 and 209 (shown exploded for clarity). Roll 203 comprises non-rotating shaft 210, retained in slot 211 of bracket 207, and rotating shaft 213 retained in aperture 212 of bracket 209. Bracket 209 is fastened to the forward top portion of truck bed wall 215 adjacent to cab 117 by fasteners 219. In a similar manner, bracket 207 is fastened to forward top portion of truck wall 221 by fasteners (not shown).

Cover web 111 is rectangular in shape with the front end attached to the outside surface of roll 203. Back support bar 107 is retained in pocket 223 in the back end 225 of cover web 111. Ends 107A and 107B of back support bar 107 are retained in back attachment brackets 113 of FIG. 1 when cover web 111 is fully extended over truck bed 201. Cover housing 226 covers roll 203 and protects roll and cover web 111 wound on roll 203 from water and contaminants. Ends 227 and 228 of cover housing 226 frictionally engage brackets 207 and 209 to retain cover housing 226 over roll 203. Fasteners such as screws 208 may be used to secure cover housing 226. Cover housing 226 has an inverted U shaped cross section, the lower slot providing an opening for cover web 111 to be extended. Cover housing 226 also acts as a stop for back support bar 107, preventing cover web 111 from being withdrawn into cover housing 226 and defining the fully retracted position of cover web 111.

Figure 3:
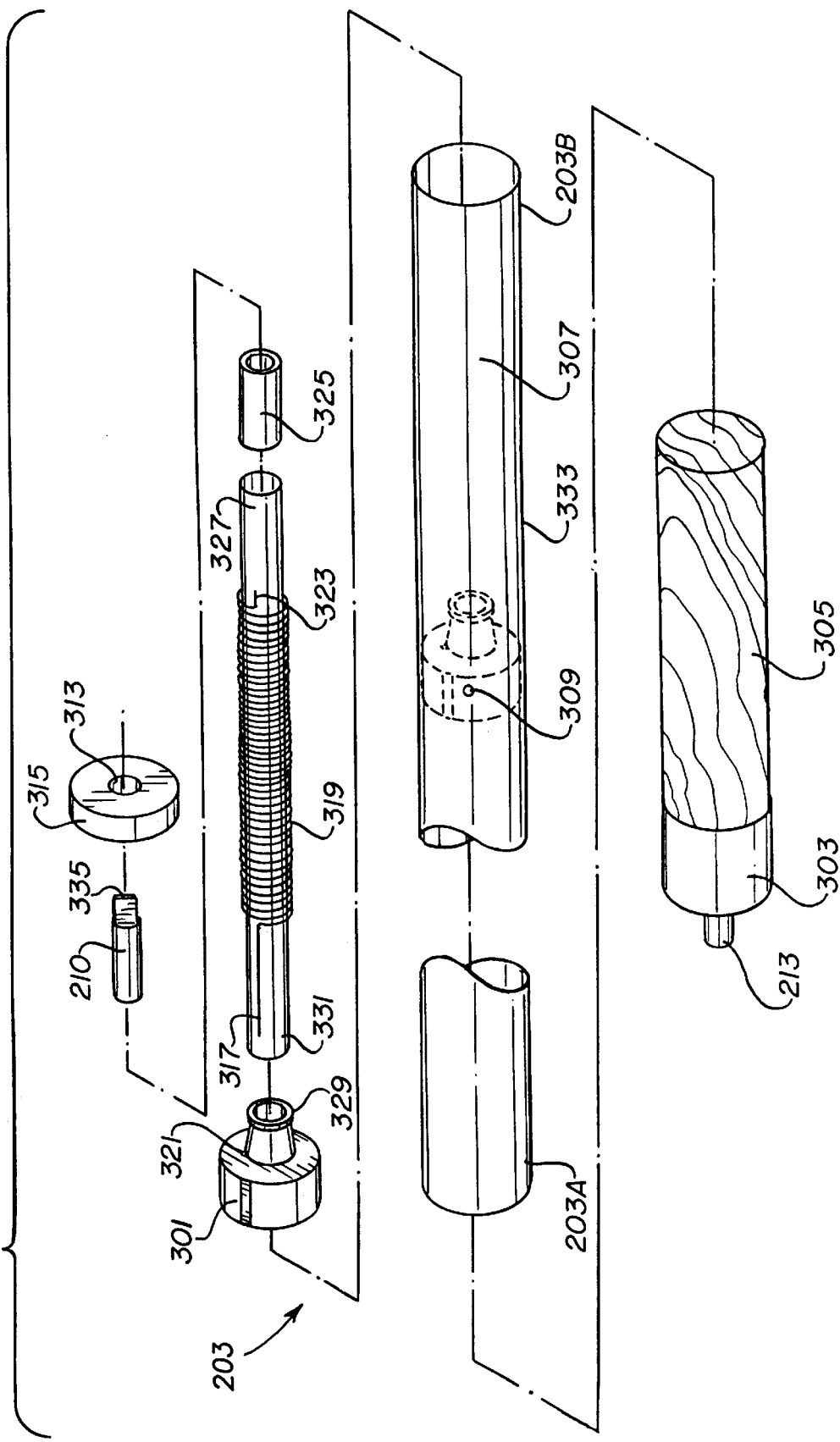
FIG. 3 is an exploded drawing of the roll of the cover apparatus showing the rotating shaft, non-rotating shaft, roll shell, and helical spring.

FIG. 3 is an exploded drawing of roll 203 which provides a winding surface and a winding force to cover web 111. Roll 203 comprises rotating shaft 213 which supports roll end 203A and is connected to drive bushing 301 by coupling 303 and shaft extension 305. Drive bushing 301 is fixed inside roll shell 307 by a fastener 309. Non-rotating shaft 210 supports roll end 203B on sleeve portion 313 of bearing end 315. Bearing end 315 is press fitted into end 203B of roll shell 307. End 317 of helical spring 319 is fixed in aperture 321 of drive bushing 301. End 323 of helical spring 319 is fixed to support rod 327 fixed to non-rotating shaft 210 by ferrule 325. Support rod 327 supports helical spring 319 and is in turn supported by bearing portion 329 of drive bushing 301. Bearing portion 329 of drive bushing 301 provides a rotational fit between bearing portion 329 and support rod end 331.

The front end of cover web 111 of FIG. 2 is fixed to outside surface 333 of roll shell 307. Cover web 111 is wrapped around roll shell 307. Upon withdrawal of cover web 111, shell 307 rotates, rotating end 317 of helical spring 319 with respect to end 323. Helical spring end 323 is rotationally fixed by key portion 335 of non-rotating shaft 210 by slot 211 of bracket 207 (see FIG. 2). Thus, withdrawal of cover web from roll 203 creates a retracting torque on roll shell 307, resulting in a withdrawal force on web 111.

FIG. 4 is a detail perspective drawing of back attachment bracket 113 showing groove 401 for retaining an end of back support bar 107 (see FIG. 1). Bracket 113 is retained on back wall portion 403 of the truck bed by fasteners 405. Other fasteners such as snap fasteners or twist fasteners may be used to attach the back end of cover web 111 to the back of the truck.

FIG. 5 is a cross section of the cover apparatus taken at lines 5—5 of FIG. 2. In the extended position of FIG. 1, cover web 111 extends substantially across top portion 501 of truck bed wall 502. Web 111 width is chosen so that web extension 503 is at least one half of wall truck wall width 505. In the preferred embodiments, web extension 503 is at least three fourths of wall width 505. In the preferred embodiment, web extension 503 is over a flat portion of top portion 501.

Figure 6A:
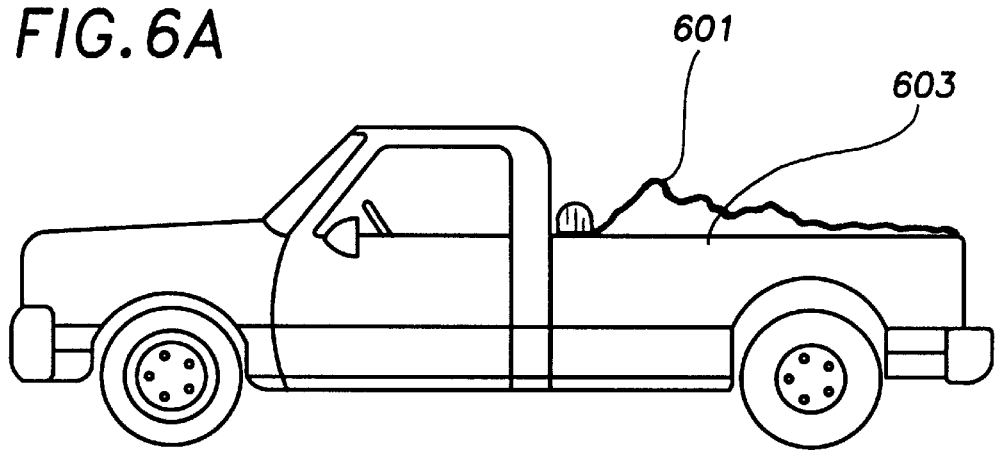
FIG. 6A is a side elevation drawing of the cover web of a cover apparatus without side fasteners when the truck is traveling at highway speeds.
Figure 6B:
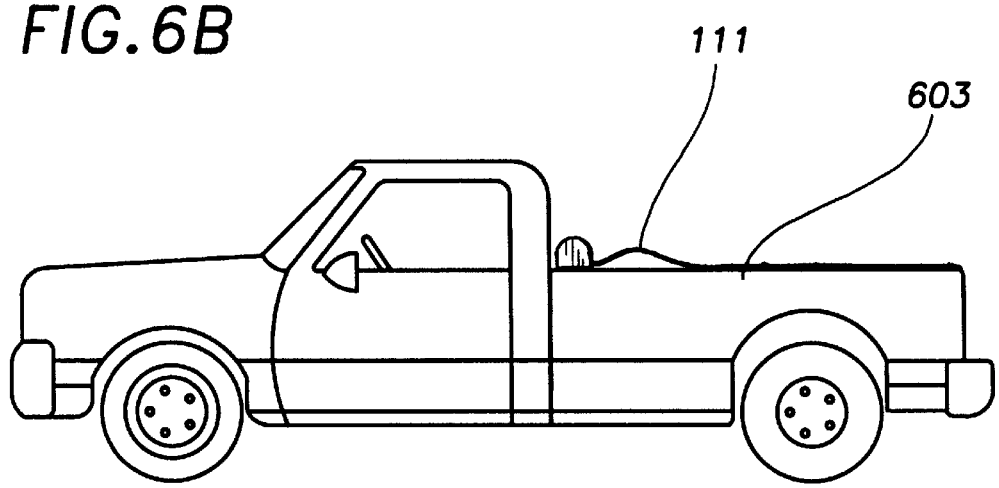
FIG. 6B is a side elevation drawing of the cover web of present invention when the truck is traveling at highway speeds.

Surprisingly, it was discovered that a sufficient retraction force on the cover web, especially if in combination with sufficient weight and stiffness of the cover web provides sufficient stability of the web under most static and dynamic conditions without additional cover side fasteners or the use of tracks mounted along the side walls of the truck bed. FIG. 6A is a side view of a truck cover without side fasteners at highway speeds of 65 miles per hour. Local atmospheric pressure disturbances caused by the vehicle motion result in cover web 601 separation from bed 603, resulting in poor load coverage and possible damage to the cover apparatus. FIG. 6B is a side view of cover web 111 of the present invention utilizing a sufficient retraction force and a sufficiently stiff cover material at the same highway conditions. Cover web 111 is disturbed only slightly, providing good load coverage at highway speeds. The elimination of side fasteners, and/or side tracks significantly improves the speed of extension and retraction of the cover and allows use with loads above the bed walls.

The retraction force exerted on cover web 111 is chosen to be at least 0.4 pounds per lineal inch width of the cover web and, preferably, at least 0.45 pounds per lineal inch for standard sized pickup trucks. In practice, the retraction force must not be so high that extension and retraction of the cover web is difficult for the operator. Compact pickup trucks may utilize a higher retraction force of 0.6 pounds per lineal inch width or higher without making operation difficult.

Adequate retraction force of the cover Web is determined by selection of the helical spring material, helical spring wire gauge, spring diameter and number of turns as well as the roll shell diameter. The maximum retraction force may be adjusted by the amount of pre-load or torque produced by the helical spring when the web is fully retracted on the roll.

In the preferred embodiment, the helical spring material is a spring steel such as music wire. The wire gauge is a major parameter in determining the retracting force and should be at least 0.072 inches in diameter, and preferably at least 0.080 inches in diameter for typical spring steels. The relaxed spring outer diameter is approximately 0.875 inches. The relaxed spring length is 12–14 inches long. The number of coils is 100–200 and preferably 175. The roll shell diameter is 1–4 inches and preferably 1.5 inches.

The cover material is a polymer-impregnated fabric. In the preferred embodiment, the polymer is polypropylene and the fabric is polyester. The cover web is a minimum weight of 10 ounces per square yard and, preferably, at least 14 ounces per square yard.

Pull cord 114, attached to back end 237 of cover web 111 of FIG. 2, provides a means for the operator to extend and retract the cover web. Due to the relatively high retraction force required to stabilize the cover without edge fasteners cover extension is most easily done from the rear of the truck. A pull cord length of at least one half and, preferably, at least three fourths of the extended cover length allows a single operator to easily perform this task. In the preferred embodiment, pull cord 114 is made of natural or synthetic rope or webbing. In other embodiments, pull cord 114 may be made of elastomers or other polymeric materials.

For applications involving long web extension lengths such as long beds, beds without tool boxes, etc., additional support to web 111 may be desirable for improved stability of the cover web, especially under difficult blowing conditions caused by storms or adjacent large truck traffic. In these cases, additional cover web support is provided by one or more straps 121 placed over and/or under the cover web as shown in FIG. 1.

One end of an over and under support strap 509 is shown in FIG. 5. Upper strap 511 provides additional top support to web 111 and lower strap 513 provides additional bottom support to web 111. An end fastener, such as hook and loop fastener 515 on one end of strap 509 engages a complementary hook and loop fastener 517 attached to the outside of bed wall 502 to retain the support strap. Fastener 511A on the opposite end of upper strap 511 and fastener 513A on the opposite end of lower strap 513 are attached to fasteners 519 on the bed wall on the other side of the truck in a similar manner. Support straps may made from synthetic or natural fiber webbing, or from elastic materials such as natural or synthetic rubber.

Accordingly, the reader will see that the RETRACTABLE COVER APPARATUS FOR TRUCK BEDS provides a truck cover which protects bed loads in the bed and does not require side fasteners. The apparatus provides the following additional advantages:

The cover may be quickly and easily extended or retracted by a single operator;

loads extending above the bed walls are protected;

The cover is durable, and

The apparatus is low in cost and simple to maintain.

Although the description above contains many specifications, these should not be construed as limiting the scope of the invention but as merely providing illustrations of some of the presently preferred embodiments of this invention. For example, other web retraction means such as electric motor or spring powered gear units may be used. Thus the scope of the invention should be determined by the appended claims and their legal equivalents, rather than by the examples given.

I claim:

1. A retractable cover apparatus for a pickup truck bed, the apparatus utilizing cover retraction force and cover weight to maintain cover stability during vehicular motion, the apparatus comprising:

a roll rotatably supported at each end by a bracket attachable to a front portion of the truck bed with the roll in a transverse relationship with the truck bed;

a rectangular shaped cover of a flexible web material comprising a web weight of at least ten ounces per square yard, the cover comprising a front end, a back end, and two sides, the front end fixed to the roll and the back end comprising a back fastener component for securing the back end of the cover to a complementary back fastener component attachable to a rear portion of the truck bed, the cover further comprising a retracted position wherein the cover is wrapped fully on the roll and an extended position wherein the back fastener component is engaged to the complementary back fastener component, the two sides of the cover being generally smooth with an absence of side fasteners;

a retraction means attached to the roll for providing a retraction force on the cover, the retraction means providing a retraction force at least 0.4 pounds per inch of cover width when the cover is in the extended position, the cover width being the transverse distance between the side edges of the cover;

wherein the retraction force in the extended position and cover weight provides stability of the cover during vehicular motion.

2. The apparatus of claim 1 comprising a first shaft fixed to the roll, a second shaft rotatably supported by a bearing from the roll, and a helical spring, a first end of the helical spring connected to the roll and a second end of the helical spring connected to the second shaft.

3. The apparatus of claim 2 wherein a first bracket rotatably supports the first shaft and a second bracket non-rotatably supports the second shaft.

4. The apparatus of claim 1 comprising a roll cover attached to the brackets.

5. A retractable cover apparatus for a pickup truck bed, the apparatus utilizing cover retraction force and cover web weight to maintain cover stability during vehicular motion, the apparatus comprising:

a roll of predetermined diameter transversely and rotatably attachable to a front portion of the truck bed by a bracket on each end of the roll;

a rectangular shaped cover of a flexible web material comprising a web weight of at least ten ounces per square yard, the cover comprising a front end, a back end, and two sides, the front end fixed to the outside surface of the roll and the back end comprising a transverse support bar attached to the web material and a back fastener component for securing the back end of the cover to a complementary back fastener component attachable to a rear portion of the truck bed, the cover comprising a retracted position wherein the cover is wrapped fully on the roll and an extended position wherein the back fastener component is engaged to the complementary back fastener component, the two sides of the cover being generally smooth with an absence of side fasteners;

a spring retractor attached to the roll, the spring retractor comprising predetermined spring dimensions and predetermined spring material for providing a retraction force of at least 0.4 pounds per inch of cover width when the cover is in the extended position; and a pull cord attached to the back end of the cover;

wherein a combination of the web weight and the retraction force in the extended position provides stability of the cover during vehicular motion.

6. The retractable cover apparatus of claim 5 comprising an auxiliary support strap of a length sufficient to stretch from one side of the truck bed to the other side of the truck bed, the strap securable to the truck bed by a fastener on each end of the strap.

7. The retractable cover apparatus of claim 6 wherein the strap comprises an upper elastic portion and a lower elastic portion, the upper and lower portions attached to a first end of the strap, the upper portion comprising a second end upper portion fastener and the lower portion comprising a second end lower portion fastener.

8. The cover apparatus of claim 5 wherein the flexible web comprises a polymer impregnated fabric.

9. The retractable cover apparatus of claim 5 where wherein the retraction force is at least 0.45 pounds per inch of cover width.

10. The retractable cover apparatus of claim 5 where wherein the retraction force is at least 0.6 pounds per inch of cover width.

11. The cover apparatus of claim 5 wherein the flexible web comprises a polymer impregnated fabric, the web having a weight of at least 14 ounces per square yard.

12. The retractable cover apparatus of claim 8 where wherein the retraction force is at least 0.45 pounds per inch of cover width.

13. The retractable cover apparatus of claim 8 where wherein the retraction force is at least 0.6 pounds per inch of cover width.

14. The retractable cover apparatus of claim 11 where wherein the retraction force is at least 0.45 pounds per inch of cover width.

15. The retractable cover apparatus of claim 11 where wherein the retraction force is at least 0.6 pounds per inch of cover width.

* * * * *